(12) United States Patent
Trainer et al.

(10) Patent No.: US 8,193,750 B2
(45) Date of Patent: Jun. 5, 2012

(54) ELECTRICAL MACHINE ARRANGEMENT

(75) Inventors: David Reginald Trainer, Derby (GB);
Harsh Agarwal, London (GB); Stephen Mark Husband, Derby (GB); Gareth Edward Moore, Nottingham (GB); David James Powell, Sheffield (GB); Stephen Andrew Long, Carmel, IN (US)

(73) Assignee: Rolls-Royce PLC, London (GB)

( * ) Notice: Subject to any disclaimer, the term of this patent is extended or adjusted under 35 U.S.C. 154(b) by 575 days.

(21) Appl. No.: 12/379,937

(22) Filed: Mar. 4, 2009

(65) Prior Publication Data
US 2010/0045221 A1    Feb. 25, 2010

(30) Foreign Application Priority Data
Mar. 17, 2008   (GB) .................................. 0804866.2

(51) Int. Cl.
*H02P 6/14* (2006.01)
(52) U.S. Cl. .............. 318/400.26; 318/400.01; 318/700; 318/701
(58) Field of Classification Search .............. 318/400.01, 318/400.26, 700, 701
See application file for complete search history.

(56) References Cited

U.S. PATENT DOCUMENTS

| | | | |
|---|---|---|---|
| 5,075,610 A | | 12/1991 | Harris |
| 5,747,962 A * | | 5/1998 | Fulton ............................ 318/701 |
| 5,850,133 A * | | 12/1998 | Heglund ........................ 318/700 |
| 5,864,477 A * | | 1/1999 | Webster ......................... 363/132 |
| 6,351,094 B1 * | | 2/2002 | Green ............................ 318/701 |
| 6,396,237 B2 * | | 5/2002 | Mayes ........................... 318/701 |
| 6,661,206 B2 * | | 12/2003 | Gallegos-Lopez .............. 322/23 |
| 6,864,657 B1 | | 3/2005 | Lungu |
| 7,057,362 B2 * | | 6/2006 | Norman ...................... 318/400.2 |
| 7,119,512 B2 * | | 10/2006 | Green ............................ 318/701 |
| 7,737,646 B2 * | | 6/2010 | Fulton et al. ................... 318/139 |
| 7,830,105 B2 * | | 11/2010 | Trainer et al. .............. 318/400.26 |
| 7,888,896 B2 * | | 2/2011 | Fulton et al. ................... 318/139 |
| 2006/0232251 A1 * | | 10/2006 | Lim et al. ......................... 322/89 |
| 2007/0182349 A1 * | | 8/2007 | Fujita et al. .................... 318/145 |
| 2008/0074063 A1 * | | 3/2008 | Fulton et al. ..................... 318/98 |
| 2008/0272721 A1 * | | 11/2008 | Mayes et al. .............. 318/400.17 |
| 2009/0039652 A1 * | | 2/2009 | Trainer et al. .................... 290/46 |

FOREIGN PATENT DOCUMENTS

| | | |
|---|---|---|
| EP | 1 039 625 A2 | 9/2000 |
| EP | 1 209 806 A2 | 5/2002 |
| GB | 2 433 360 A | 6/2007 |

* cited by examiner

*Primary Examiner* — Walter Benson
*Assistant Examiner* — Kawing Chan
(74) *Attorney, Agent, or Firm* — Oliff & Berridge, PLC

(57) ABSTRACT

Electrical machine arrangements have advantages with regard to providing local electrical power and starting. Embedding such electrical machine arrangements in machinery such as gas turbine engines is advantageous in removing mechanical linkages and reducing aerodynamic drag. However, the components utilized must be able to withstand harsh environmental conditions and therefore the DC link capacitor used for smoothing of voltage fluctuations are limited to relatively low capacitance densities. Low density DC link capacitors require large sizes which render electrical machines less acceptable for embedded usage. By providing offset of electrical current in inductance elements such as stator windings and stator coils of electrical machines in dead periods of the cycle a reduction in DC link capacitor requirements is achieved reducing the size, weight and complexity of installing electrical machines in gas turbine engines.

15 Claims, 6 Drawing Sheets

Phase Current vs time

Phase dc link current (A)

Phase Current

DC Link Phase Currents & Total DC Link Current

Phase Currents vs time waveform

Phase Current vs Time (A)

ELECTRICAL MACHINE ARRANGEMENT

BACKGROUND

The present invention relates to electrical machines and more particularly to electrical machines such as switched reluctance electrical machines in which electrical current is injected in order to provide a motoring function or a generating function.

Electrical machines are utilised in a wide range of environments and for a large number of purposes. Of particular interest with regard to aspects of the present invention is utilisation of electrical machines within gas turbine engines. These electrical machines are utilised for provision of electrical generating capacity as well as in order to act as electrical motors for various functions. There is a desire to locate such electrical machines as closely as possibly and preferably embedded within the gas turbine engine. By such an approach complex mechanical transmission mechanisms are removed giving significant operational and efficiency benefits.

As indicated above such electrical machines can act as generators as well as starter motors for the gas turbine engine. The electrical machine in normal operation as indicated would generally act as an electrical generator but during such starting functions it will be understood that the electrical machine will temporarily act as a motor. Generation systems typically utilise power electronic converters to enable very high power density electrical machine technologies to be used. Such technologies include switched reluctance electrical machines. High densities enable further size and weight benefits to be achieved in comparison with traditional synchronous electrical machines. Additionally, the inherent direct electrical current interface allows parallel connection and sharing of electrical power generated by different spools of the gas turbine engine.

SUMMARY

Whilst there are significant benefits with regard to embedding electrical machines within a gas turbine engine it will also be understood that by such location it is necessary for the machines to have a high level of reliability and acceptability. The robustness of switched reluctance electrical machines has attractions but the necessity of a high capacity DC link capacitor for the direct electrical bus interface can create significant size and weight problems. The traditional approach with regard to land based electrical machines is to use an electrolytic capacitor for the DC link capacitor but electrolytic capacitors are not conveniently available for aerospace situations due to their limitations in terms of operating temperature, capacitance stability, a limited life and orientation. In such circumstances less capacitively dense technologies such as foil film capacitors are required for the DC link capacitor but in view of their lower capacitive density it will be appreciated that weight and size penalties are incurred.

A particular type of electrical machine of importance for embedding in machines such as gas turbine engine is a switched reluctance machine. FIG. 1 provides a graphic illustration in idealised conditions of the inductance response and torque values for one phase of a switched reluctance machine with a constant electrical current excitation. As will be appreciated a rotor is turned, rotated, relative to a stator and in particular the rotor is rotated relative to the inductance elements, or stator coils, within a stator structure. Such rotation of the rotor is over a rotation cycle is defined between angles W and Z. During rotation through angle W to X the supply of an electrical current produces a positive torque, e.g. this is a motoring period 1, whilst the supply of electrical current over the angle of rotation X to Y produces negative torque, e.g. this is a generating period 2. A dead period, or spacer period, 3 has a period of constant inductance between angles of rotation Y to Z where the supply of electrical current does not lead to any torque production. The reason for no torque production is that the stator poles and inductance elements, or stator coils, of the electrical machine are not aligned. During this dead period, or spacer period, 3 an electrical machine can only store energy in the inductance element, or stator coil, of the electrical machine in accordance with the relationship stored energy equals ½ $LI^2$ where L is the inductance of the inductance element, or stator coil, and I is the current.

In normal operation a switched reluctance machine is limited to either motoring or generating by carefully controlling the angles at which electrical current is supplied to the stator coils, or inductance elements, that is to say motoring during angle of rotation W to X or generating during angle of rotation X to Y.

FIG. 2 illustrates a basic three phase switched reluctance machine to provide drive and to illustrate different electrical current flows through the power source for a switched reluctance electrical machine 10. A DC link capacitor 11 acts as a smoothing element and smoothes out any ripple with respect to the direct electrical current, e.g. DC current, as a result of switching through the motor period 1 or generating period 2 (FIG. 1). It will be understood that only the alternating part of the electrical current, e.g. the alternating current component of the electrical current flows through the DC link capacitor 11 whereas direct electrical current, DC current, flows through the inductance circuit comprising the power supply 12 supplying electrical current to the inductance elements, or stator coils, Ph in the electrical machine 10. The alternating current flowing through the DC link capacitor 11 produces a voltage ripple which in turn is proportional to the current time area depicted in FIG. 3.

FIG. 3a depicts electrical current flowing through the DC link capacitor 11 against time. The electrical current waveform shows a pure alternating current flowing through the DC link capacitor 11. The average of the electrical current is zero or has no real component associated with it. When the electrical current passes through the DC link capacitor 11 it produces a voltage ripple. This voltage ripple is proportional to the current time area. FIG. 3b shows voltage ripple against time produced by the electrical current flowing through the DC link capacitor 11 as depicted in FIG. 3a. The shaded parts 31 in FIG. 3b are illustrative of voltage ripple waveforms corresponding to a large negative current time area in the current waveform about a zero point. This parameter determines the size of the DC link capacitor 11 for an electrical machine 10. A large voltage ripple is highly undesirable as it makes the system unstable. The larger the current time area, the larger the voltage ripple and hence the larger the DC link capacitor 11 required to smooth it. In practical applications a voltage ripple of about 10% of the electrical power supply 12 is usually allowed. In such circumstances for a direct current supply of 270 volts a voltage ripple of only 27 volts is acceptable within a system.

Accordingly the present invention provides an electrical machine arrangement comprising a rotor, a stator, a power supply including a DC link capacitor and a controller, the stator having a plurality of phases, each phase comprising at least one stator coil, each phase having a motoring period, a generating period and a dead period, the controller being arranged to supply electrical current from a first phase of the electrical machine at the end of the motoring period of the first phase to a second phase of the electrical machine at the end of the dead period and at the start of the motoring period of the second phase, the controller being arranged to supply electrical current from the first phase of the electrical machine at the end of the motoring period of the first phase to a third phase of the electrical machine at the end of the generating period and at the start of the dead period of the third phase, the controller being arranged to supply electrical current from the power supply to the second phase of the electrical machine at the end of the dead period and at the start of the motoring period of the second phase and the controller being arranged to supply electrical current from the power supply to the third phase of the electrical machine at the end of the generating period and at the start of the dead period of the third phase whereby the size of the DC link capacitor is reduced.

Preferably the controller being arranged to sequentially supply electrical current from the first phase of the electrical machine during the motoring period of the first phase to the second phase of the electrical machine during the dead period of the second phase and then to supply electrical current from the second phase of the electrical machine during the dead period of the second phase to the first phase of the electrical machine during the motoring period of the first phase.

Preferably the controller comprises a plurality of switch arrangements, each phase of the electrical machine having a respective one of the switch arrangements. Generally, each switch arrangement comprises an H-bridge, or a half-bridge, the switch arrangement including asymmetric switch elements and diodes. Generally, each bridge comprises a pair of switch elements, the at least one stator coil of each phase is arranged between the pair of switch elements. Generally, when both switch elements are closed the switch arrangement provides for charging of the at least one stator coil of the respective phase. Generally, when one switch element is closed and the other switch element is open the at least one stator coil of the respective phase is partially discharged through a respective diode. Generally, when both switch elements are open the at least one stator coil of the respective phase is discharged.

Typically, the electrical machine is a switched reluctance electrical machine. Typically, the stator comprises three or more phases.

The present invention also provides a method of operating an electrical machine comprising a rotor, a stator, a power supply including a DC link capacitor and a controller, the stator having a plurality of phases, each phase comprising at least one stator coil, each phase having a motoring period, a generating period and a dead period, the method comprising supplying electrical current from a first phase of the electrical machine at the end of the motoring period of the first phase to a second phase of the electrical machine at the end of the dead period and at the start of the motoring period of the second phase, supplying electrical current from the first phase of the electrical machine at the end of the motoring period of the first phase to a third phase of the electrical machine at the end of the generating period and at the start of the dead period of the third phase, supplying electrical current from the power supply to the second phase of the electrical machine at the end of the dead period and at the start of the motoring period of the second phase and supplying electrical current from the power supply to the third phase of the electrical machine at the end of the generating period and at the start of the dead period of the third phase whereby the size of the DC link capacitor is reduced.

Preferably the method comprises sequentially supplying electrical current from the first phase of the electrical machine during the motoring period of the first phase to the second phase of the electrical machine during the dead period of the second phase and then to supply electrical current from the second phase of the electrical machine during the dead period of the second phase to the first phase of the electrical machine during the motoring period of the first phase.

BRIEF DESCRIPTION OF THE DRAWINGS

Embodiments of aspects of the present invention will now be described by way of example with reference to the accompanying drawings in which:

FIG. 3b is an illustration of a voltage ripple against time produced by the electrical current flowing through the DC link capacitor as depicted in FIG. 3a;

DETAILED DESCRIPTION OF EMBODIMENTS

Figure 1:
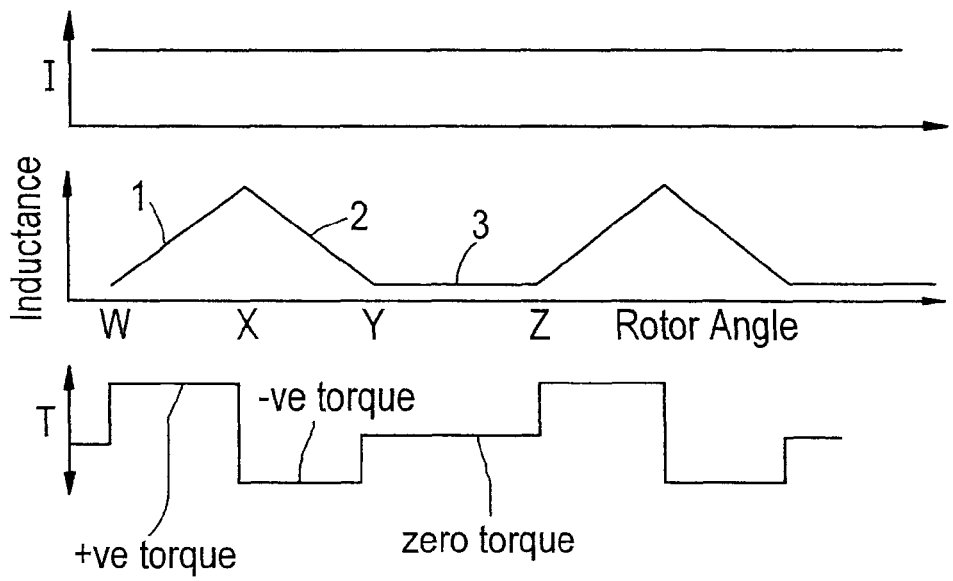
FIG. 1 is a graphic illustration in idealised conditions of the inductance response and torque values for one phase of a switched reluctance machine with a constant electrical current excitation.
Figure 2:
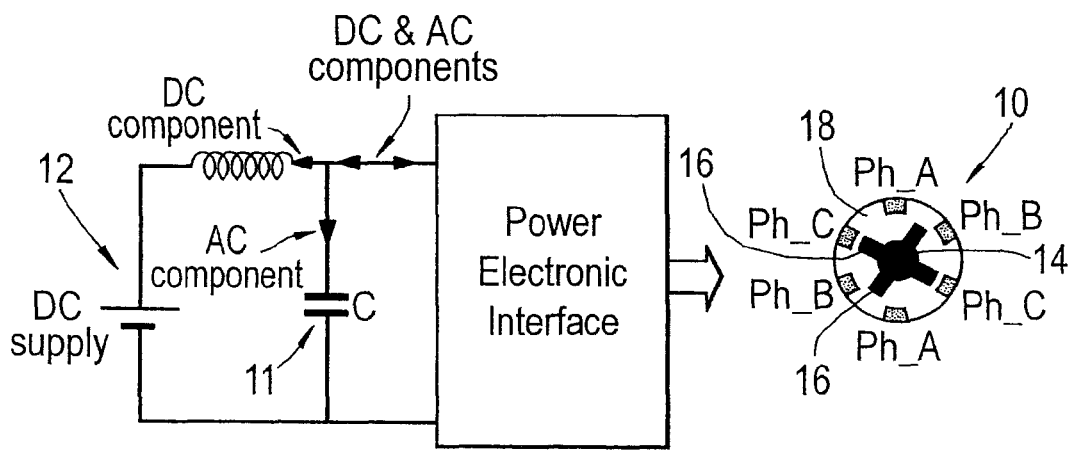
FIG. 2 is an illustration of a basic three phase switched reluctance machine to provide drive and to illustrate different electrical current flows through a power source for a switched reluctance electrical machine.
Figure 3A:
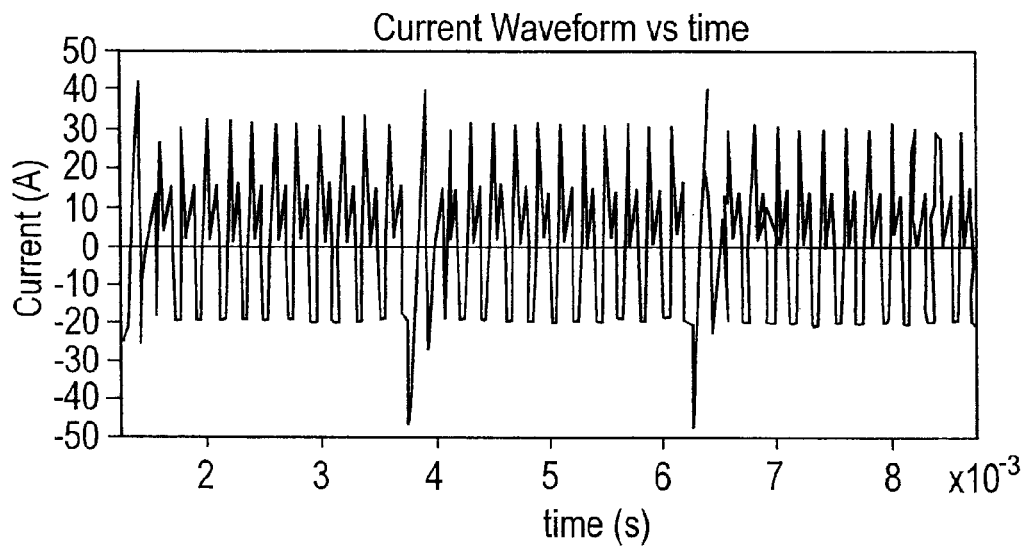
FIG. 3(a) is an illustration of electrical current flowing through a DC link capacitor against time.
Figure 3B:
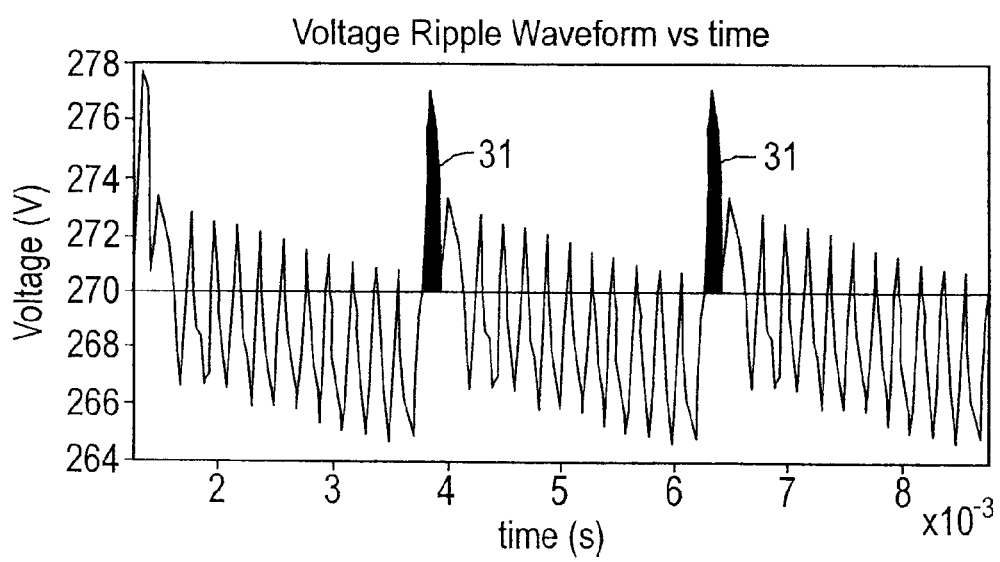
Figure 4:
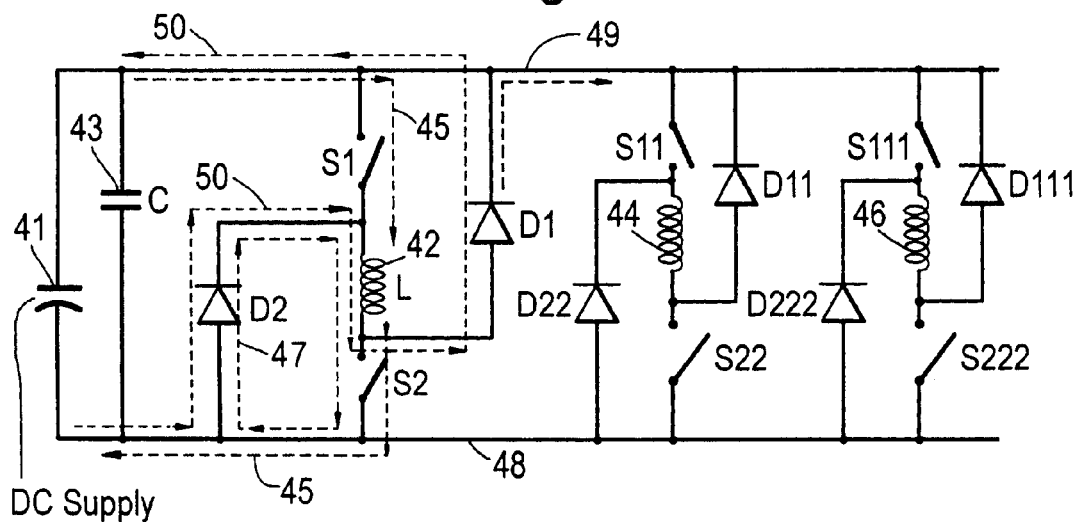
FIG. 4 is a circuit diagram illustrating an electrical machine arrangement in accordance with aspects of the present invention.

An electrical machine can be defined using an electrical circuit as depicted in FIG. 4. Thus, the circuit comprises a direct electrical current (DC) supply 41 which has supply rails 48, 49 and a first inductance element, first stator coil, 42 is electrically connected across the DC supply 41 such that electrical current can be supplied to the inductance element, or stator coil, 42 in cyclic and sequential periods in order to drive the electrical machine 10 as a motor or generator. A DC link capacitor 43 is provided in order to smooth voltage fluctuations as the inductance element, stator coil, 42 is switched between charging and discharging. As will be appreciated with a direct electrical current the voltage ripple produced across the inductance element, stator coil, 42 must be reduced. In such circumstances a switching arrangement is provided comprising switch elements S1, S2 and diodes D1, D2. As indicated the inductance element, or stator coil, 42 will charge and discharge in order to provide torque relative to a rotor 14 in an electrical machine 10. The electrical machine 10, as shown in FIG. 2 comprises a rotor 14 and a stator 18. The rotor 14 has rotor poles 16 and the stator 18 has stator coils 42, 44 and 46 in phases Ph_A, Ph_B and Ph_C.

In a practical electrical machine several phases will be provided with a respective inductance element, stator coil, for each phase. Aspects of the present invention relate to providing an electrical machine arrangement in which the DC link capacitor 43 can be specified with a lower capability and therefore acceptability within environments where space and weight must be minimised. The DC link capacitor 43 will act across all phases to smooth voltage fluctuations due to electrical current variations. As depicted in FIG. 4 a second inductance element, a second stator coil, 44 is illustrated. This second inductance element, second stator coil, 44 is similarly charged and discharged with electrical current from the direct electrical current (DC) supply 41 and in association with the DC link capacitor 43 achieve appropriate function in terms of operational stability. The second inductance element, or second stator coil, 44 will also has a switch arrangement comprising switches S11, S22 and diodes D11, D22. Operation with regard to the first inductance element, or first stator coil, 42 will be described below but with regard to charging and discharging it will be appreciated that the second inductance element, or second stator coil, 44 and other inductance elements, or other stator coils 46, for other phases in the electrical machine 10 arrangement has switches S111 and 5222 and diodes D111 and D222 and will similarly operate.

It will be appreciated that the switching arrangement utilised with regard to the first inductance element, or first stator coil, 42 is an H-bridge but a half-bridge can also be used. The switches S1, S2 and diodes D1, D2 are in an asymmetric configuration to achieve the necessary control of the charging and discharging of the first inductance element, or first stator coil, 42. As indicated the circuit described with regard to the first inductance element, or first stator coil, is similar for all phases and therefore all inductance elements, or stator coils, in an electrical machine in accordance with aspects of the present invention.

As will be understood and described above the inductance element, stator coil, 42 is supplied with electrical current to provide torque to a rotor 14 of the electrical machine 10. In use a direct electrical current supply typically in the order of 270 volts is supplied by the DC supply 41 across the supply rails 48, 49 either side of the inductance element, stator coil, 42. The switches S1, S2 are configured to appropriately discharge and charge the inductance element, stator coil, 42. Generally, there are three modes, or configurations, of operation with regard to the inductance element, stator coil, 42.

In a charging mode the DC supply 41 is provides an electrical current which charges the phase inductance element, stator coil, 42. In such circumstances the switches S1 and S2 are closed. The switches S1 and S2 control the supply of electrical current and act in pairs across the inductance element, stator coil, 42 and therefore charge it. Broken line 45 illustrates the direction of the electrical current flowing through the first inductance element, stator coil, 42. Such charging of the inductance element, stator coil, 42 is referred to as fluxing and as indicated is generally phased in order to associate with the poles 16 of the a rotor 14 to drive rotation of that rotor 14 with a torque force value.

It will be understood that continuous application of a direct voltage to the inductance element, stator coil, 42 will cause a continuing rise in current within the inductance element, stator coil, 42. In such circumstances and in order to achieve a desired level of current the direct voltage is chopped. This chopping process is referred to as free wheeling. In order to provide control one of the switches S1 or S2 is opened and the other switch S2 or S1 remains closed. In such circumstances electrical current discharges either around diode D2 or diode D1, the phased inductance element, stator coil, 42 and the closed switch S2 or S1. This technique creates a soft chopping for current control. The possible routes for such partial discharge are shown by broken lines 47 in relation to a closed switch S2 and diode D2. As indicated by having one switch open and one switch closed a soft gradual drift with regard to discharge is achieved allowing control of the current flowing through the first inductance element, stator coil, 42 over a see tooth range as depicted in FIG. 5.

In order to achieve phased control of an electrical machine 10 it will be appreciated that the inductance element, stator coil, 42 at certain periods of the rotational cycle must be completely discharged. This process is known as defluxing. In order to completely discharge the inductance element, stator coil, 42 both switches S1 and S2 open as depicted In FIG. 4. In such circumstances the diodes D1 and D2 are reverse biased and a negative voltage is applied across the inductance element, stator coil, 42. This negative voltage causes the inductance element, stator coil, 42 to discharge and the electrical current flows in a direction opposite to that of charging across the supply rails 48, 49. This direction is depicted by a broken line 50. However, it will be noted that the direction of electrical current flow through the inductance element, stator coil, 42 remains the same at all times.

By the above modes of operation it will be appreciated that an electrical machine 10 in accordance with aspects of the present invention can operate in order to drive a rotor 14 with an appropriate torque. It will be understood that at low speeds of operation there is a possibility for a high voltage ripple in the DC link capacitor 43 due to the defluxing or complete discharging process. At the end of a motoring period, when the inductance element, stator coil, 42 is discharging, the direction of current flow through the supply rails 48, 49 or the DC link capacitor 43 changes from a positive current flow to a negative current flow rapidly. Numerically speaking, this current goes from a positive to a negative from the perspective of the supply rails 48, 49. Such a large negative current in the DC link capacitor 43 will eventually roll off to a zero level but nevertheless produces a large current time area and a large voltage ripple which is a source of instability with regard to operation of an electrical machine 10 such that it is necessary to use a large capacity DC link capacitor 43 with prior arrangements in order to provide smoothing.

Figure 5:
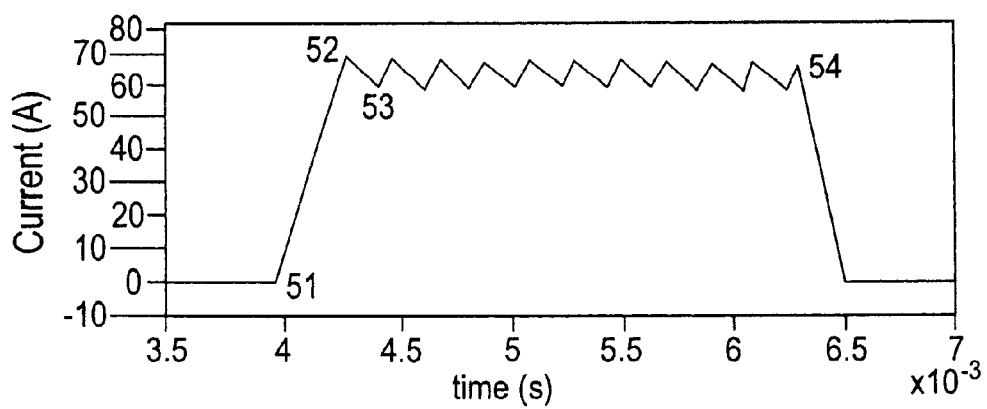
FIG. 5 is a graphical illustration of electrical current during a single phase of drive for an electrical machine arrangement.

As indicated above, FIG. 5 illustrates a typical charging profile for an electrical inductance element, stator coil, 42 in accordance with aspects of the present invention. Thus initially an electrical current is supplied at point 51 and the electrical current builds progressively over a short time period to a level at point 52 such that at this point the free wheeling or chopping process with regard to the inductance element, stator coil, 42 occurs with only one switch S1 closed in order to cause partial discharge to a point 53 over an acceptable range of electrical current. This process will continue over the whole period until full deflux, or discharge, occurs at point 54 where again the electrical current rapidly falls to zero to allow other phases of the electrical machine 10 to operate. The DC link capacitor 43 allows this rapid switching if of adequate capacity and specification.

Figure 6:
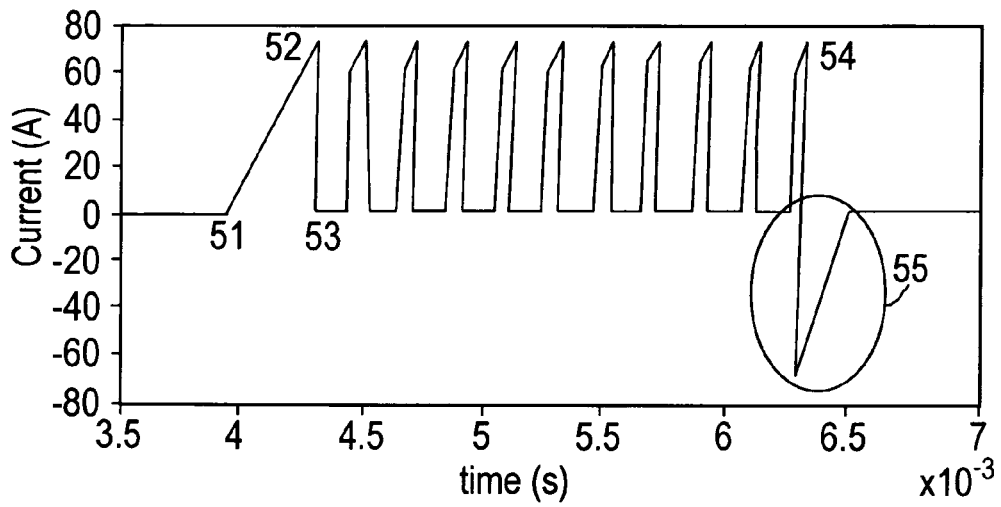
FIG. 6 is a graphic representation of an electrical current in a DC link capacitor for a single phase illustrating "free wheel" and discharging.

FIG. 6 illustrates the electrical current presented to the DC link capacitor 43 as a result of the current flowing through the inductance element, stator coil, 42. Corresponding reference numerals have been utilised to show comparison with the electrical current through the inductance element, stator coil, 42. The electrical current is as a result of controlling the charge and discharge of inductance element, stator coil, 42. Thus, as can be seen upon initial charging there is an increase in electrical current between point 51 and point 52. At trim or free wheeling discharge there is no current flowing between point 52 and point 53 whilst at point 54 with respect to full defluxing, or discharging, the electrical current passes into a reverse flow and therefore instability. An area circled 55 corresponds to the electrical current time area and causes a large voltage ripple. This electrical current time area is considerably worse at low speeds and during starting of the electrical machine. Such worse case scenarios are due to the long dwell over angles of rotation as well as typically higher necessary torque to initially drive the electrical machine. It will be understood that when specifying a DC link capacitor 43 for an electrical machine 10 it is necessary to consider this worse case scenario and therefore a large capacity is required. Typical initial low speeds are considered up to 1,000 rpm whilst an electrical machine may operate normally at in excess of 30,000 rpm.

In accordance with aspects of the present invention approaches are taken with regard to utilising discharge for offsetting electrical capacitance requirements. Such offsetting is typically through providing initial shift in the electrical charge provided to an inductance element, stator coil, such that the necessary electrical current drawn from the DC link capacitor will be reduced and therefore the capabilities of that DC link capacitor can similarly be of a lower specification. In such circumstances it is possible to provide a voltage ripple which is more easily accommodated within permitted levels of satisfactory performance. Approaches described below relate to shifting the inductance element from a zero electrical current, providing a none zero or offset electrical current base and by active filtering where required.

With regard to phasing control from a zero electrical current in an inductance element it will be appreciated in a normal switched reluctance machine the fluxing, that is to say charging of the inductance element, stator coil, in a phase begins when all the transients in the other motoring phases have settled, that is to say the second phase in a second inductance element, stator coil, only begins the fluxing process, that is to say charging when the first phase in a first inductance element, stator coil, has defluxed, that is to say completely discharged. Such an approach leads to large negative electrical current areas and the voltage ripples during the defluxing, discharging, process with regard to the DC link capacitor 43 (FIG. 4). In such circumstances a large DC link capacitor is required. This problem is further exacerbated in situations of harsh environmental conditions for the electrical machine such that film and foil capacitors of a lower capacitance density are only suitable.

Figure 7:
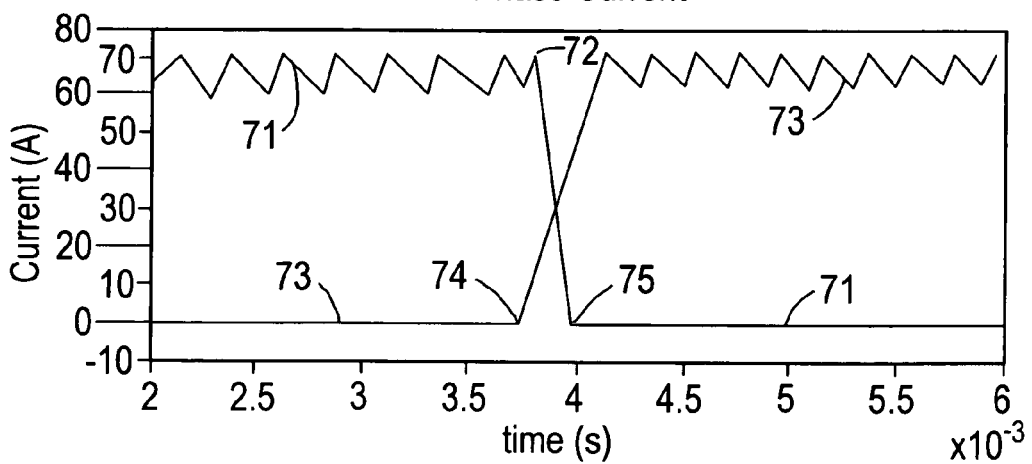
FIG. 7 is a graphic illustration of electrical current for two phases defined by a first inductance element and a second inductance element of an electrical machine arrangement in accordance with aspects of the present invention.

In accordance with the first aspects of the present invention, and at the possible expense of loss of torque, the charging, or fluxing, of one phase, that is to say one inductance element, stator coil, and the discharging, or defluxing, of another phase or inductive element, or stator coil, are synchronised. FIG. 7 provides a graphic illustration of such phasing or synchronising. In such circumstances a first phase of a first inductance element, or first stator coil, is shown by line 71 and therefore as can be seen operates at its electrical current until the start of discharge, or deflux, at point 72. A second phase in a second inductance element, or second stator coil, is shown by line 73 such that whilst in the motor period it will be noted that the second phase is substantively at zero current. As the first phase and second phase move through a transient it will be noted that there is an overlap. This overlap occurs at point 72 in the first phase 71 and at point 74 in the second phase 73. The phases 71, 73 are synchronised. In such circumstances through an appropriate control technique and switching electrical current is chopped between levels of 70 amps and 60 amps defined by the saw tooth as described in the free wheeling discharge approach. Such chopping implies an electrical current is to be in a hysteresis band in the order of 10 amps. By effectively initiating fluxing, or charging, of the second phase at point 74 rather than after complete defluxing, or discharging, of the first phase with a prior arrangement which would be at least point 75 it will be understood that electrical current from the first phase is still offsetting the capacitance flow such that the second phase 73 can built to a point such that there is crossover. This crossover point limits the negative current which can flow and therefore limits the electrical current time area as described above reducing the loading on the DC link capacitor and therefore allowing a lower capability for that DC link capacitor.

Figure 8:
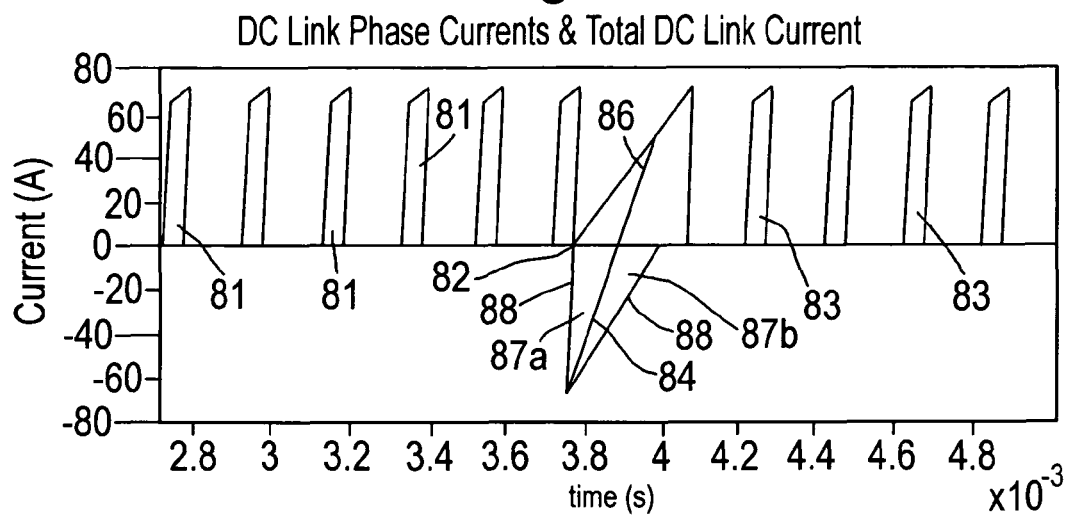
FIG. 8 is a graphic representation of electrical current in a DC link capacitor subject to discharge flow control in accordance with aspects of the present invention.

FIG. 8 shows the respective phase currents for the phases as depicted in FIG. 7 as flowing through the DC link capacitor utilised for smoothing. The electrical current peaks 81 are those associated with chopping charging as described above with regard to FIG. 6 to maintain electrical current within the hysteresis band. With prior arrangements as indicated the electrical current would continue until charging with further power pulses 83 to sustain the second phase in the second inductance element within its hysteresis band. Changeover occurs at point 82 with as indicated previously with the prior arrangement an initial charge 86 until the upper end of the hysteresis band is approached. With a prior arrangement with a DC link capacitor an electrical current time area 87 is defined by lines 88. As can be seen this is a significant area 87 (87a and 87b) and as indicated it is necessary to use a large DC link capacitor to absorb this area. By aspects of the present invention and synchronising of the discharging, or defluxing, of the first phase and the charging, or fluxing, of the second phase in the first inductive element and the second inductive element respectively a steeper charging profile 84 of the second phase is provided reducing the size of the resultant area 87a and therefore the necessary capacity for the DC link capacitor.

It will be appreciated that electrical current is supplied into the motoring period of the second phase, that is to say the second inductance element, or second stator coil, at an instant whilst the electrical current in the motoring period of the first phase in the first inductance element, first stator coil, is still being taken out. Such an approach does not utilise the dead period, or spacer period, between the motoring period and the generator period and only uses the positive slope of the inductance profile as defined earlier. In such circumstances with phase control from a zero current the only change is with regard to the switching process in respect of applying electrical current to the inductance elements, stator coils. Electrical current is supplied a bit earlier and at an instant when the preceding phase has not fully discharged, or defluxed.

The above approach can be utilised with respect to all electrical currents applied to inductance elements, stator coils, in phases of an electrical machine in accordance with aspects of the present invention. By earlier application of electrical current to a subsequent inductance element, stator coil, part of the discharging, or defluxing, current of one phase is utilised in charging the motoring period of the next phase and reducing the amount of electrical current flowing back to the DC link capacitor. Such a reduction in the electrical current flowing back to the DC link capacitor reduces the electrical current time area and hence the voltage ripple which the DC link capacitor is required to smooth out for stability purposes. It will be understood if less smoothing is required through a smaller electrical current time area it will enable a smaller DC link capacitor to be used for the same necessary level of potential voltage ripple limitation.

A second approach with regard to aspects of the present invention is in relation to phasing control from a none zero electrical current in a subsequent second inductance element from a first inductance element. In the technique described above it will be appreciated that charging, or fluxing, of the phases in the respective first inductance element, first stator coil, and the second inductance element, second stator coil, is from a substantially zero initial electrical current in each respective inductance element, stator coil. However with the inductance elements, stator coils, it will be understood that it is possible to utilise the finite amount of time for the current to build up to the required motoring electrical current. Such building up of the electrical current in an inductance element, stator coil, begins in the so called dead period, or spacer period, between the motoring period and the generating period in an electrical machine switching arrangement. It will be appreciated that charging, or fluxing, from an offset or none zero value for the electrical current already existent in an inductance element, stator coil, reduces the current flow requirement from the electrical capacitance. As the dead period does not contribute torque production as there is misalignment between the rotor poles 16 and the inductance elements, stator coils, maintaining an electrical current in the inductance element, stator coil, during this dead period will generally not have a detrimental effect upon progressive torque in the electrical machine.

Figure 9:
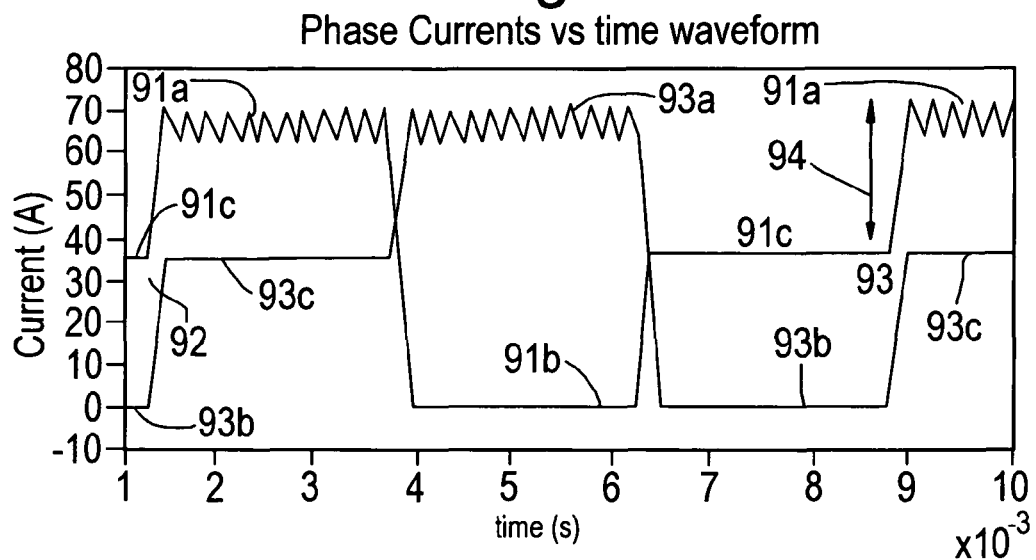
FIG. 9 is a schematic illustration of electrical current in two phases where inductance elements are maintained at an offset current.

FIG. 9 provides a graphic illustration of two phases with regard to electrical current in inductance elements, stator coils, in accordance with aspects of the present invention. In a first phase 91 it will be noted that a cycle is defined between the points 92 and 93. The electrical current has three periods in the cycle, in a first inductance element, first stator coil, there is a fluxed or charged period 91a, a defluxed or discharged period 91b and an offset or partially charged period 91c. Similarly, a second inductance element, second stator coil, over the cycle between points 92 and 93 has a fluxed or charged period 93a, a defluxed or discharged period 93b and an offset or partially charged period 93c. As indicated having an electrical current passing through each inductance element, or stator coil, during the dead period has no effect upon the rotor poles 16 and therefore no detrimental effect with regard to torque. In such circumstances "priming" the electrical inductance elements, stator coils, with electrical current limits the additional electrical current required to be supplied by the power supply to a shift in the order of that depicted by step 94. Furthermore, there will be less disturbance in the voltage at the DC link capacitor and therefore a lower electric current time area which must be smoothed by that DC link capacitor.

It will be appreciated that it is through an appropriate switching mechanism that the electrical current can be supplied to the inductance elements, stator coils, to achieve the states a, b, c as defined in FIG. 9. It will be appreciated that the offset electrical current 93c, 91c will be determined by operational requirements but will be greater than zero, that is to say the defluxed or discharged state. As a typical example of the offset electrical current in the offset or partially charged period, which is the dead period, the current would be in the order of 50% of the current in the charging or fluxing period. By such an approach the electrical current 91c, 93c during the dead or spacer period is achieved through a similar electrical current controller used for providing the motoring electrical current 91a, 93a. A controller is arranged to keep the electrical current offset 91c, 93c at a generally defined electrical current level with a small ripple range.

The above approach is with regard to charging of the second inductance elements, stator coils, utilising the defluxing or discharging of a prior first inductance element, stator coil. Thus, returning to FIG. 4 it will be understood that the first inductance element, stator coil, 42 and the second inductance element, stator coil, 44 are electrically connected across the rails 48, 49. In such circumstances when the first inductance element, stator coil, 42 discharges it will be appreciated that the second inductance element, stator coil, 44 is held in a parallel relationship with the DC link capacitor 43. In such circumstances the electrical discharge flow will pass towards the DC link capacitor 43 as well as towards the second inductance element, stator coil, 44 in order to charge the second inductance element, stator coil, 44. The proportionality between the paths to the second inductance element 44 and the DC link capacitor 43 will depend upon the switching configuration as well as the resistance in the respective paths. Nevertheless by Kirchhoffs laws the sum of the electrical current must be maintained and so a proportion of the electrical current will pass towards the second inductance element, stator coil, 44 for conservation over the whole circuit. In such circumstances the second inductance element, stator coil, 44 will absorb an electrical charge which will then be subtracted from the electrical charge provided to the DC link capacitor 43 and the DC supply 41. Thus the voltage fluctuations and electrical current flows through the DC link capacitor 43 will be reduced. Reductions in the voltage fluctuations as well as electrical current through the DC link capacitor 43 will reduce its necessary capacity and therefore size.

Figure 10A:
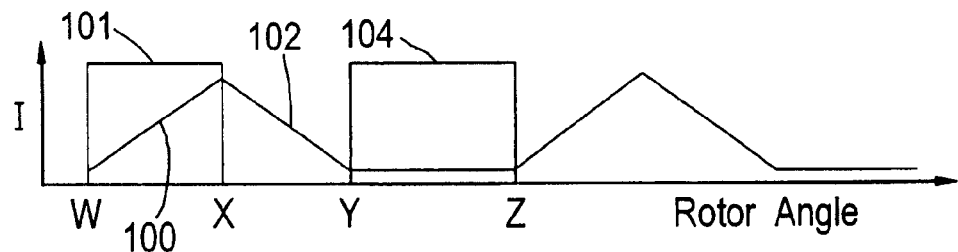
FIGS. 10(a) and 10(b) are graphic representations illustrating direct electrical current supply into an inductance element in accordance with an advantageous embodiment of aspects of the present invention; and, FIG. 11 is a graphic illustration of electrical current in respective first inductance elements and second inductance elements for respective phases of an electrical machine in accordance with aspects of the present invention.

In addition to utilising discharge flows from prior inductance elements, stator coils, as described above it will also be appreciated that specific electric current supply can be provided by a direct supply process. FIG. 10(a) illustrates again inductance variation over a rotational cycle from W to Z. In such circumstances in a motoring period 100 it will be understood that a motoring current 101 can be supplied to provide progressive torque in an electrical machine. As described above in a generating period 102 a supplied electrical current will provide for electrical generation. Nevertheless, it may be possible to balance torque requirements for the machine in terms of reduction in the torque capability for the machine as a result of such electrical current supplied in the generating period balanced by a reduction in the DC link capacitor required for stability. However, in accordance with a preferred aspect of the present invention it is the spacer period or dead period 104 defined between rotational angles Y to Z which is of particular use. As indicated above electrical current supplied to an inductance element, stator coil, during this dead period will have little effect with regard to the torque characteristics of the electrical machine. Electrical current supplied into the inductance element, stator coil, in such circumstances will simply be stored and provide an offset to reduce the necessary electrical current from the DC power supply to achieve the desired level of electrical current in the inductance element, stator coil.

In the above circumstances in addition to using electrical discharge flows from prior inductance elements in accordance with aspects of the present invention subsequent second inductance elements can have additional electrical current supplied directly to them. This directly supplied electrical current 104 will be supplied preferably in the dead period as indicated over the rotational angles Y to Z and/or possibly partially in an opposing phase.

Figure 10B:
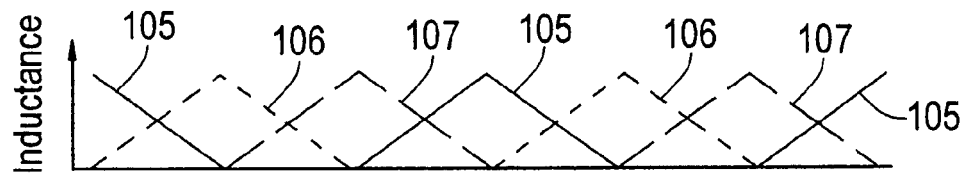

FIG. 10(b) illustrates the inductance changes for three phases 105, 106, 107 of an electrical machine. This is as a result of the machine design and geometry and electrical current supplied to the respective inductance elements, stator coils, over cyclic and sequential phases to generate rotation as required. In order to achieve appropriate current control with respect to one inductance element, stator coil, the electrical machine will be sequenced appropriately. By supplying electrical current into the inductance element, stator coil, during the dead period between rotation angles Y to Z it will be understood that the electrical energy is effectively stored to augment the electrical current provided by the DC link capacitor of the DC power supply. In such circumstances by appropriate control each phase of the electrical machine will be allowed to store and release energy as appropriate to augment or "help out" the DC link capacitor in terms of achieving the required electrical current in the motoring period. In such circumstances it will again be appreciated that the DC link capacitor can be reduced in size and weight for a comparable operational function in terms of smoothing voltage ripple and voltage fluctuations.

By direct electrical current supply each phase will successively be presented with electrical current in its dead period where such electrical current will have no effect upon torque generation. In such circumstances it will be appreciated there will always be one phase, that is to say the inductance element, or stator coil, which requires charging during the dead period. It will also be appreciated that the function of the period between the successive dead periods is largely determined by the mechanical design of the electrical machine and can be optimised to achieve the best benefit with regard to supply of electrical current for filtering and energy storage functionality. It will also be appreciated that the inductance of the inductance element, stator coil, is generally at its lowest level when the supply of electrical current is required and for optimisation of rating and performance of the electrical machine drive.

Figure 11:
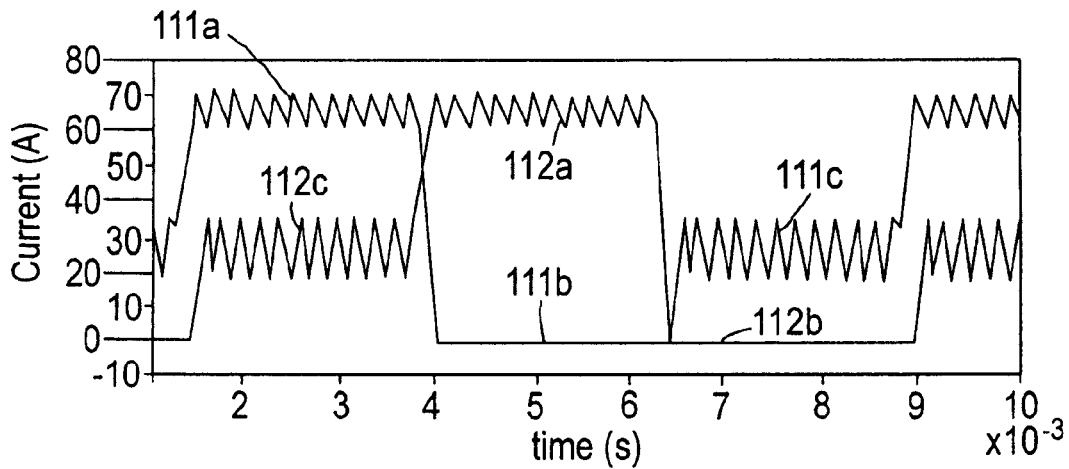

FIG. 11 provides a graphical illustration of phased electrical current against time for two phases, that is to say first and second inductance elements, first and second stator coils, in accordance with aspects of the present invention. A first phase is depicted by a line 111 whilst the second phase is depicted by a line 112. As with the description above with regard to offsetting of inductance elements, stator coils, utilising discharge flows from prior inductance elements, stator coils, it will be noted that over a phase cycle each phase 111, 112 has a motoring period 111a, 112a, a defluxed or discharged period 111b, 112b and a supplied electrical current section in the dead period (rotational angle Y to Z) 111c, 112c. In such circumstances the inductance element, stator coil, is again offset to reduce the electrical current required from the power supply including the DC link capacitor to achieve motoring function in the electrical machine.

As can be seen a current controller is used which is similar to that to provide the electrical current in order to supply electrical current into the dead periods. Such an approach as described above generates a hysteresis band in which the switching arrangement free wheels or gradually discharges over the hysteresis band. Generally the current in the section 111c, 112c will be maintained at a desired level such as 50% of the current in the motoring period 111a, 112a. This also produces a hysteresis band of approximately 10% for operational purposes. In such circumstances by offsetting the current in the inductance element, stator coil, during the dead period of the rotational cycle it will be understood that the motoring period in terms of the electrical current requirements from the power supply will be reduced and therefore a reduction in the DC link capacitor value required.

All of the techniques described above may be utilised appropriately through switching in an electrical machine in accordance with aspects of the present invention. As will be appreciated in order to achieve appropriate performance it is desirable to sequence the techniques appropriately. At the beginning of operation electrical current will be supplied by the power supply to those phases in the dead period of the rotation cycle whilst electrical current will be supplied in those phases during the motoring periods of the rotation cycle. When the motoring period in one phase is charging and taking current from the power supply, regeneration occurs in the dead period of the other phase. This implies that to charge the phase in the motoring period, part of the current/energy can be supplied by the energy stored from the phase in the dead period reducing the DC link capacitor current ripple requirements and hence the current time area. When the phase in the motoring period is free wheeling, that is to say decaying across the hysteresis band, the phase in the dead period is charging by the parallel distribution supply along the supply rails 48, 49 (FIG. 4) so that the inductance element, stator coil, charged during the period can provide current. At the instance of charging, or fluxing, and discharging, or defluxing, the two phases are synchronised so as to reduce the negative current time area during discharging, or defluxing. Charging, or fluxing, can start from a none zero value limiting the requirements on the power supply and DC link capacitor. The level of current from which charging, or fluxing, starts will generally be controlled by a current controller for appropriate operation.

In considering a three phase electrical machine according to the present invention, a three phase switched reluctance electrical machine, the controller is arranged to supply electrical current from a first phase of the electrical machine at the end of the motoring period of the first phase and at the start of the generating period of the first phase to a second phase of the electrical machine at the start of the motoring period of the second phase and at the end of the dead period of the second phase. The controller is arranged to supply electrical current from the first phase of the electrical machine at the end of the motoring period of the first phase and at the start of the generating period of the first phase to a third phase of the electrical machine at the end of the generating period of the generating period of the third phase and at the start of the dead period of the third phase. The controller is arranged to supply electrical current from the power supply to the second phase of the electrical machine at the start of the motoring period of the second phase and at the end of the dead period of the second phase. The controller is arranged to supply electrical current from the power supply to the third phase of the electrical machine at the start of the dead period of the third phase and at the end of the generating period of the third phase. This reduces the size of the DC link capacitor of the power supply. The power supply supplies electrical current to the second phase and the third phase to supplement the electrical current supplied by the first phase to the second phase and the third phase.

Any surplus electrical current supplied from the first phase of the electrical machine at the end of the motoring period of the first phase is supplied to the DC link capacitor, but preferably any surplus electrical current is small so as to minimise the size of the DC link capacitor.

In the present invention the controller is arranged to sequentially supply electrical current from the first phase of the electrical machine during the motoring period of the first phase to the second phase of the electrical machine during the dead period of the second phase and then to supply electrical current from the second phase of the electrical machine during the dead period of the second phase to the first phase of the electrical machine during the motoring period of the first phase.

Any surplus electrical current flowing from the first phase of the electrical machine during the motoring period of the first phase to the second phase of the electrical machine during the dead period of the second phase is supplied to the DC link capacitor, but again this electrical current is small.

Similarly any surplus electrical current flowing from the second phase of the of the electrical machine during the dead period of the second phase to the first phase of the electrical machine during the motoring period of the first phase is supplied to the DC link capacitor, but again this electrical current is small.

Any losses in electrical current flow between the first phase during its motoring period and the second phase during its dead period are made up by electrical current supplied by the DC supply and/or the DC link capacitor.

As indicated above one of the particular advantages of aspects of the present invention is a reduction in the DC link capacitor value and size for phasing control in an electrical machine in accordance with aspects of the present invention. For example with an electrical machine rated at 5 kilowatts with a mean motoring electrical current of 65 amps and a 5 amp current ripple it has been found that by the above techniques with regard to adjusting the electrical current through direct injection and storage of electrical energy within the inductance element, stator coil, and proportional charging through discharge flows it is possible to achieve significant reductions in necessary DC link capacitor values. For comparative purposes in normal operation without techniques in accordance with aspects of the present invention it is found that a DC link capacitor in the order of 400 microfarads is required resulting in a DC link capacitor size of 8000 cubic centimeters utilising a capacitor density quotient of 0.05 microfarads per cubic centimeter. Through using phasing control a DC link capacitor with the value of 235 microfarads is needed with a volumetric size of 4700 cubic centimeters whilst with direct injection of electrical current directly to the inductance element, stator coil, a DC link capacitor with a value of 125 microfarads and therefore a volumetric size of 2500 cubic centimeters may be adequate. In such circumstances the DC link capacitor in terms of comparison with electrical machine size is reduced from something in the order of 5.8 to 1 to 1.8 to 1. Such an approach renders providing electrical machines embedded within gas turbine engines more acceptable.

Particular advantages relate to utilisation techniques in accordance with aspects of the present invention at very low speeds and starting. It will be understood at these speeds greater torques are required and therefore corresponding voltage ripples encountered which are significantly greater. By active electrical current supply and proportionate charging by discharge flows from previous inductance elements, stator coils, the necessary electrical current from the power source and in particular the DC link capacitor is reduced to enable a DC link capacitor of more acceptable size to be utilised.

At higher rotational speeds there is generally a lower torque requirement and therefore the electrical current flowing through the phase windings, stator coils, is comparatively lower such that techniques in accordance with aspects of the present invention are less necessary but nevertheless allow operation with a lower DC link capacitor value.

By aspects of the present invention and different control techniques it will be appreciated that there is a reduction in the DC link capacitor requirement and parameters for an operational electrical machine. By reducing the size of the overall switched reluctance machine system it will be understood that embedding within a machine such as a gas turbine engine is more acceptable. Through different methods associated with phasing of electrical current and direct electrical current injection it is possible to reduce the DC link capacitor requirement and therefore the size and weight of that DC link capacitor. By utilisation of active electrical current injection greatest reduction in DC link capacitor size is achieved but nevertheless adds to switching requirements, The in situ discharge flows though less dramatic in terms of reduction in capacitance requirements still provide an enhancement in stored energy within the inductance element, stator coil, to allow power pulsing in the motor phase.

Charging of the inductance element, stator coil, in the dead period can be operational at low speeds or high speeds but in any event the DC link capacitor requirements are reduced.

Although described above with regard to an electrical machine as a motor it will be appreciated that the electrical machine could also be utilised as a generator with electrical pulses supplied in the generator period appropriately. Furthermore although the embodiments described above are in relation to a switched reluctance machine and a three phase machine it will also be appreciated that four phase and five phase systems could also be used.

Aspects of the present invention may be utilised with regard to other electrical machine drives in which there is a power supply with an electronic switching arrangement. For example other electrical machines such as direct current electrical machines using three or more phase permanent magnet drives using a trapezoidal rather than a sinusoidal modulation may benefit from aspects of the present invention. In such circumstances it will be appreciated that generally only two of the three phases with a permanent magnet drive are operational at one time leaving a third phase as a dead phase. This third phase in accordance with aspects of the present invention may be offset or have electrical current supplied to limit the voltage fluctuations and therefore the smoothing DC link capacitor requirements for operational performance.

Electrical machines in accordance with aspects of the present invention will be utilised generally but particularly are advantageous in situations where size, weight or cost of installed equipment is required to be minimised. Such applications include aerospace, marine, industrial and energy businesses.

Aspects and modifications to aspects of the present invention will be understood by those skilled in the art. Thus for example provision of variability with regard to the discharge flow to the subsequent or second inductance element, stator coil, may be provided to allow variation in operation of the electrical machine for particular operational requirements.

We claim:
1. An electrical machine arrangement comprising:
   a rotor,
   a stator having a plurality of phases, each phase comprising at least one stator coil, each phase having a motoring period, a generating period and a dead period, and
   a power supply including a DC link capacitor and a controller, the controller being arranged to supply electrical current from:
      (i) a first phase of the electrical machine at an end of the motoring period of the first phase to a second phase of the electrical machine at an end of the dead period and at the start of the motoring period of the second phase,
      (ii) the first phase of the electrical machine at the end of the motoring period of the first phase to a third phase of the electrical machine at the end of the generating period and at the start of the dead period of the third phase,
(iii) the power supply to the second phase of the electrical machine at the end of the dead period and at the start of the motoring period of the second phase, and
(iv) the power supply to the third phase of the electrical machine at the end of the generating period and at the start of the dead period of the third phase whereby the size of the DC link capacitor is reduced.

2. An arrangement as claimed in claim 1 wherein the controller being arranged to sequentially supply electrical current from the first phase of the electrical machine during the motoring period of the first phase to the second phase of the electrical machine during the dead period of the second phase and then to supply electrical current from the second phase of the electrical machine during the dead period of the second phase to the first phase of the electrical machine during the motoring period of the first phase.

3. An arrangement as claimed in claim 1 wherein the controller comprises a plurality of switch arrangements, each phase of the electrical machine having a respective one of the switch arrangements.

4. An arrangement as claimed in claim 3 wherein each switch arrangement is selected from the group comprising a H-bridge and a half-bridge, the switch arrangement including switch elements and diodes.

5. An arrangement as claimed in claim 4 wherein each bridge comprises a pair of switch elements, the at least one stator coil of each phase is arranged between the pair of switch elements.

6. An arrangement as claimed in claim 5 wherein when both switch elements are closed the switch arrangement provides for charging of the at least one stator coil of the respective phase.

7. An arrangement as claimed in claim 5 wherein when one switch element is closed and the other switch element is open the at least one stator coil of the respective phase is partially discharged through a respective diode.

8. An arrangement as claimed in claim 5 wherein when both switch elements are open the at least one stator coil of the respective phase is discharged.

9. An arrangement as claimed in claim 1 wherein the electrical machine is a switched reluctance electrical machine.

10. An arrangement as claimed in claim 1 wherein the stator comprises three phases.

11. A gas turbine engine incorporating an electrical machine arrangement as claimed in claim 1.

12. A method of operating an electrical machine arrangement comprising a rotor, a stator, a power supply including a DC link capacitor and a controller, the stator having a plurality of phases, each phase comprising at least one stator coil, each phase having a motoring period, a generating period and a dead period, the method comprising:
supplying electrical current from a first phase of the electrical machine at the end of the motoring period of the first phase to a second phase of the electrical machine at the end of the dead period and at the start of the motoring period of the second phase,
supplying electrical current from the first phase of the electrical machine at the end of the motoring period of the first phase to a third phase of the electrical machine at the end of the generating period and at the start of the dead period of the third phase,
supplying electrical current from the power supply to the second phase of the electrical machine at the end of the dead period and at the start of the motoring period of the second phase, and
supplying electrical current from the power supply to the third phase of the electrical machine at the end of the generating period and at the start of the dead period of the third phase whereby the size of the DC link capacitor is reduced.

13. A method as claimed in claim 12 comprising sequentially supplying electrical current from the first phase of the electrical machine during the motoring period of the first phase to the second phase of the electrical machine during the dead period of the second phase and then supplying electrical current from the second phase of the electrical machine during the dead period of the second phase to the first phase of the electrical machine during the motoring period of the first phase.

14. A method as claimed in claim 12 wherein the electrical machine is a switched reluctance electrical machine.

15. A method as claimed in claim 12 wherein the stator comprises three phases.

* * * * *